(12) United States Patent
Yoshisaka et al.

(10) Patent No.: US 10,544,856 B2
(45) Date of Patent: Jan. 28, 2020

(54) DIFFERENTIAL APPARATUS

(71) Applicant: JTEKT CORPORATION, Osaka-shi (JP)

(72) Inventors: Tadashi Yoshisaka, Kariya (JP); He Jin, Kariya (JP); Yasunori Kamitani, Fujimi (JP)

(73) Assignee: JTEKT CORPORATION, Osaka-shi (JP)

( * ) Notice: Subject to any disclaimer, the term of this patent is extended or adjusted under 35 U.S.C. 154(b) by 125 days.

(21) Appl. No.: 15/904,603

(22) Filed: Feb. 26, 2018

(65) Prior Publication Data
US 2018/0245677 A1    Aug. 30, 2018

(30) Foreign Application Priority Data

Feb. 28, 2017 (JP) ................... 2017-037752

(51) Int. Cl.
*F16H 48/08* (2006.01)
*F16H 48/38* (2012.01)
*F16H 48/40* (2012.01)

(52) U.S. Cl.
CPC ............ *F16H 48/08* (2013.01); *F16H 48/40* (2013.01); *F16H 2048/085* (2013.01); *F16H 2048/087* (2013.01); *F16H 2048/387* (2013.01)

(58) Field of Classification Search
CPC .... F16H 48/08; F16H 48/40; F16H 2048/405; F16H 2048/085; F16H 2048/087; F16H 2048/387
See application file for complete search history.

(56) References Cited

U.S. PATENT DOCUMENTS 5,890,989 A      4/1999  Yamazaki et al.
8,591,373 B2 *  11/2013  Shibagaki ............... F16H 48/08
                                                                475/230

FOREIGN PATENT DOCUMENTS

| DE | 197 16 386 A1 | 11/1997 |
| DE | 10 2014 221 408 A1 | 4/2016 |
| JP | 10-16603 | 1/1998 |
| JP | 2001-146952 | 5/2001 |

OTHER PUBLICATIONS

Extended European Search Report dated Aug. 7, 2018 in European Patent Application No. 18158311.3 citing documents AA, AO-AP therein, 9 pages.

* cited by examiner

*Primary Examiner* — Erin D Bishop
(74) *Attorney, Agent, or Firm* — Oblon, McClelland, Maier & Neustadt, L.L.P.

(57) ABSTRACT

A differential apparatus includes a differential gear mechanism in which side gears mesh with pinion gears, a pinion shaft that rotatably supports the pinion gear, a slide member that supports the ends of the pinion shaft, and pinion gear washers each disposed between the slide member and a corresponding one of the pinion gears. Movement of each pinion gear washer toward the slide member in the axial direction of the pinion shaft is restricted. When a force of the pinion gear pressing the pinion gear washer toward the slide member is less than a predetermined value, a clearance is formed between the slide member and the pinion gear washer. When the force of the pinion gear pressing the pinion gear washer toward the slide member is greater than the predetermined value, the outer surface of the pinion gear washer abuts the inner surface of the slide member.

7 Claims, 12 Drawing Sheets

DIFFERENTIAL APPARATUS

INCORPORATION BY REFERENCE

The disclosure of Japanese Patent Application No. 2017-037752 filed on Feb. 28, 2017 including the specification, drawings and abstract, is incorporated herein by reference in its entirety.

BACKGROUND OF THE INVENTION

1. Field of the Invention

The invention relates to a differential apparatus that outputs an input driving force from two side gears while allowing a difference in driving force.

2. Description of the Related Art

Differential apparatuses that output an input driving force from two side gears while allowing a difference in driving force have been used as differentials for vehicles. Examples of such differential apparatuses are disclosed in Japanese Patent Application Publication No. 2001-146952 (JP 2001-146952 A), and Japanese Patent Application Publication No. 10-16603 (JP 10-16603 A).

Differential apparatuses disclosed in JP 2001-146952 A and JP 10-16603 A include a differential gear mechanism in which two side gears mesh with a plurality of pinion gears such that the gear axis of the side gears is orthogonal to the gear axis of the pinion gears, and a pinion shaft that rotatably supports the pinion gears. In the differential apparatus disclosed in JP 2001-146952 A, the pinion shaft is supported by a differential case, and a driving force that is input to the differential case is transmitted to the two side gears via the pinion shaft and the pinion gears.

In the differential apparatus disclosed in JP 10-16603 A, the pinion shaft is supported by a cylindrical inner case, and the inner case is disposed to be movable in the axial direction in an outer case. Each of the outer case and the inner case has meshing teeth. Thus, when the inner case moves relative to the outer case to one side in the axial direction, the meshing teeth of the outer case and the meshing teeth of the inner case mesh with each other, so that the inner case and the outer case rotate together. In this meshing state, when a driving force is input to the outer case, the driving force is transmitted to the two side gears via the inner case, the pinion shaft, and the pinion gears. On the other hand, in a state in which the meshing teeth of the inner case and the meshing teeth of the outer case do not mesh with each other, transmission of the driving force from the outer case to the inner case is blocked.

That is, in the differential apparatus disclosed in JP 2001-146952 A, the differential case serves as a pinion shaft support member. Meanwhile, in the differential apparatus disclosed in JP 10-16603 A, the inner case serves as a pinion shaft support member. A washer is interposed between the inner surface of such a pinion shaft support member and the back surface of each of the pinion gears. The washer reduces the friction resistance to rotation of the pinion gear, and reduces wear of the pinion shaft support member.

When a driving force is transmitted from the pinion gear to the side gears, the pinion gear receives a meshing reaction force from the side gears. The washer is pressed against the pinion shaft support member by this meshing reaction force. The washer is also pressed against the pinion shaft support member by a centrifugal force applied to the pinion gear. Accordingly, the pinion shaft support member needs to have a sufficient strength against not only the driving force transmitted to the pinion shaft, but also the pressing force applied from each pinion gear. This is an obstacle to reducing the weight of the pinion shaft support member, and hence is a constraint on improving the vehicle fuel efficiency by reducing the weight of the differential apparatus.

SUMMARY OF THE INVENTION

An object of the invention is to provide a differential apparatus that includes a pinion shaft support member with a reduced weight.

According to an aspect of the invention, differential apparatus includes:
a differential gear mechanism in which two side gears mesh with a plurality of pinion gears such that a gear axis of the side gears is orthogonal to a gear axis of the pinion gears;
a pinion shaft that rotatably supports the pinion gears;
a hollow pinion shaft support member that supports ends of the pinion shaft and in which the differential gear mechanism is disposed; and
washers each disposed between a corresponding one of the pinion gears and an inner surface of the pinion shaft support member facing the pinion gears, each of the washers having a center portion through which the pinion shaft is inserted.

The washers are configured such that: movement of each of the washers toward the pinion shaft support member in an axial direction of the pinion shaft is restricted; when a force of each of the pinion gears pressing a corresponding one of the washers toward the pinion shaft support member is less than a predetermined value, a predetermined clearance is formed between the inner surface of the pinion shaft support member and an outer surface of the washer facing the inner surface in the axial direction; and when the force of each of the pinion gears pressing a corresponding one of the washers toward the pinion shaft support member is greater than or equal to the predetermined value, the outer surface of the washer abuts the inner surface of the pinion shaft support member.

According to the aspect described above, the pressing force applied to the pinion shaft support member from each pinion gear is reduced. Therefore, it is possible to provide a differential apparatus including a pinion shaft support member with a reduced weight.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the invention will be described with reference to FIGS. 1 to 9.

Figure 1:
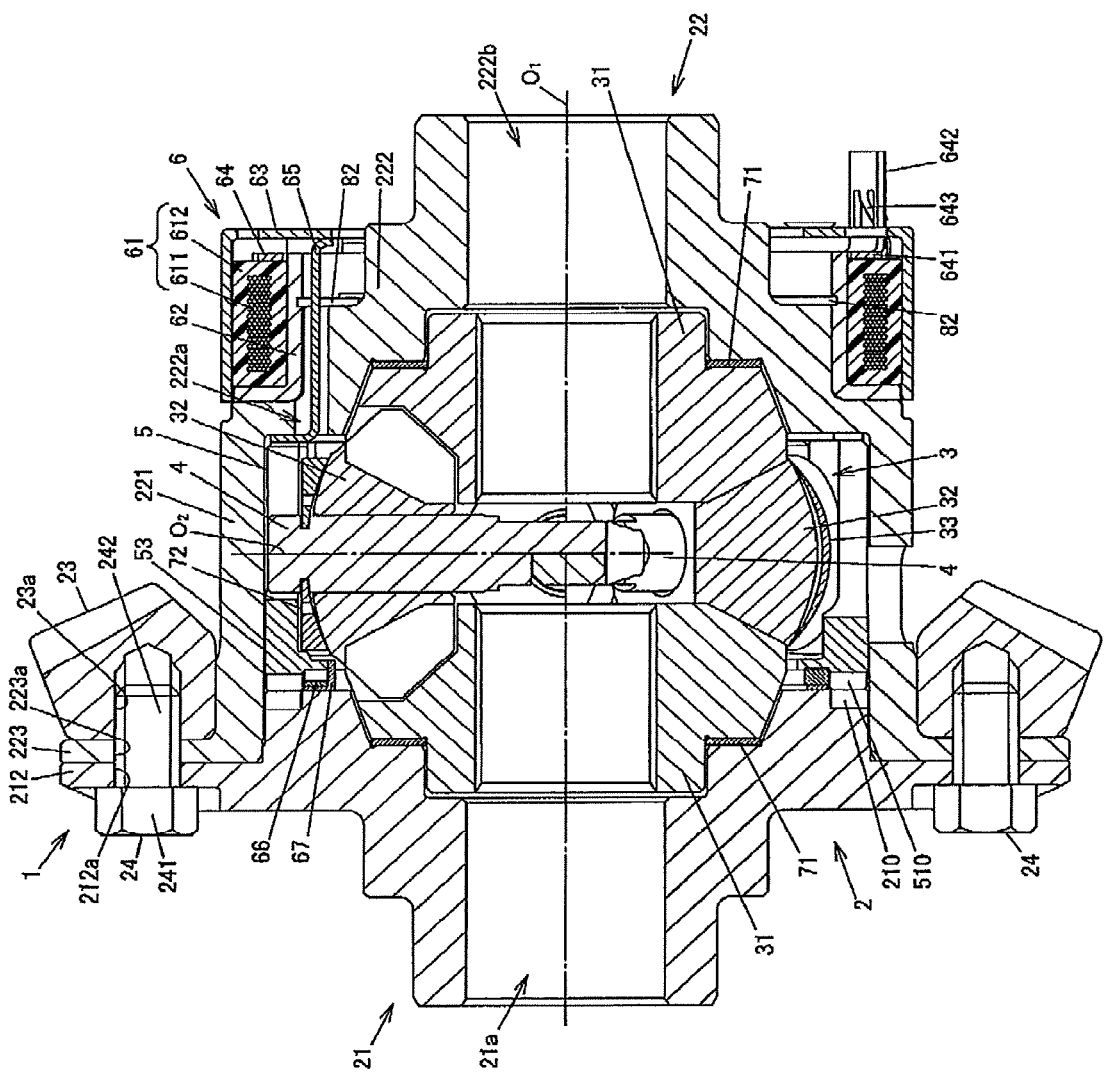
FIG. 1 is a cross-sectional view illustrating an exemplary configuration of a differential apparatus according to a first embodiment of the invention.
Figure 2:
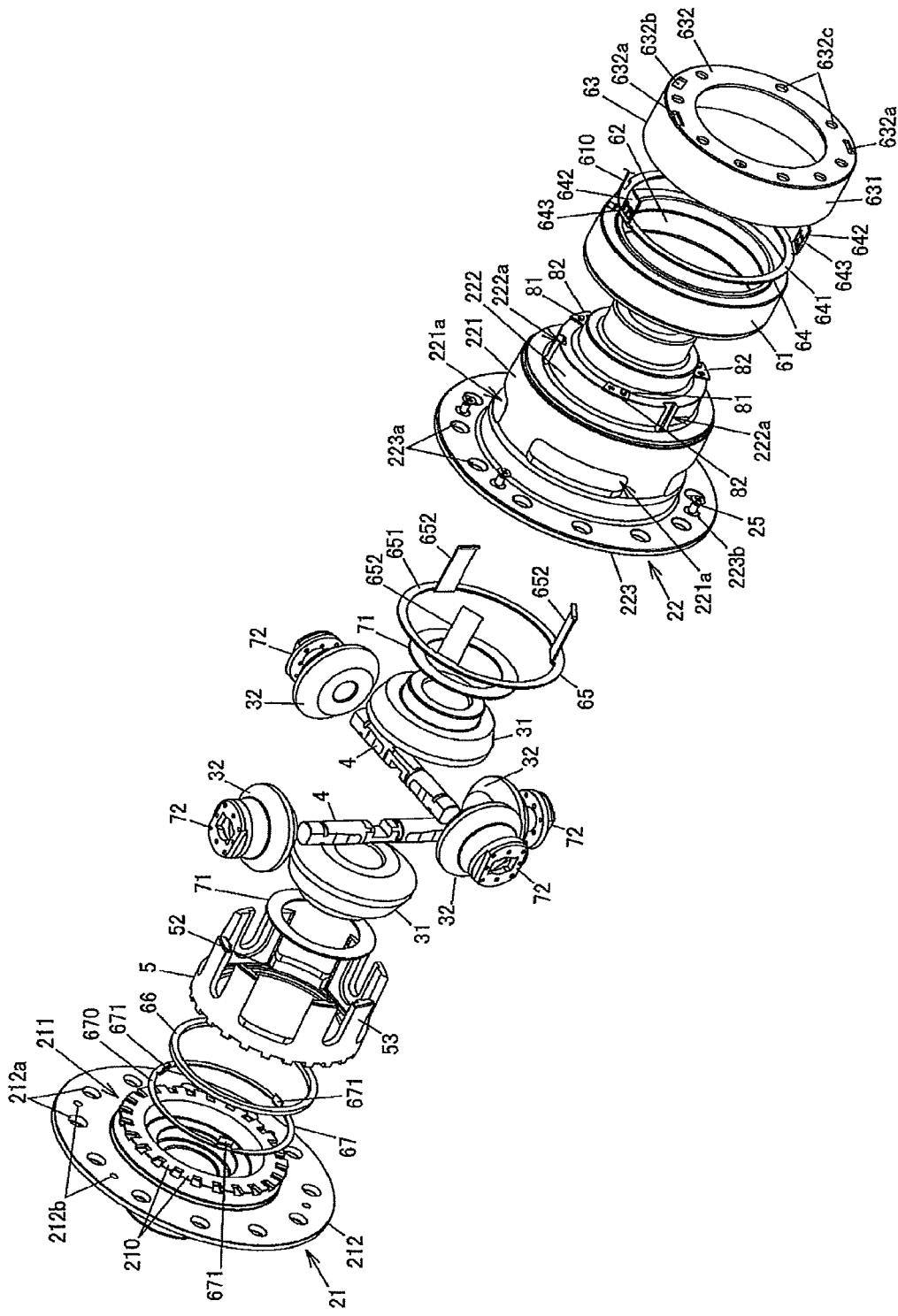
FIG. 2 is an exploded perspective view illustrating the differential apparatus.
Figure 3:
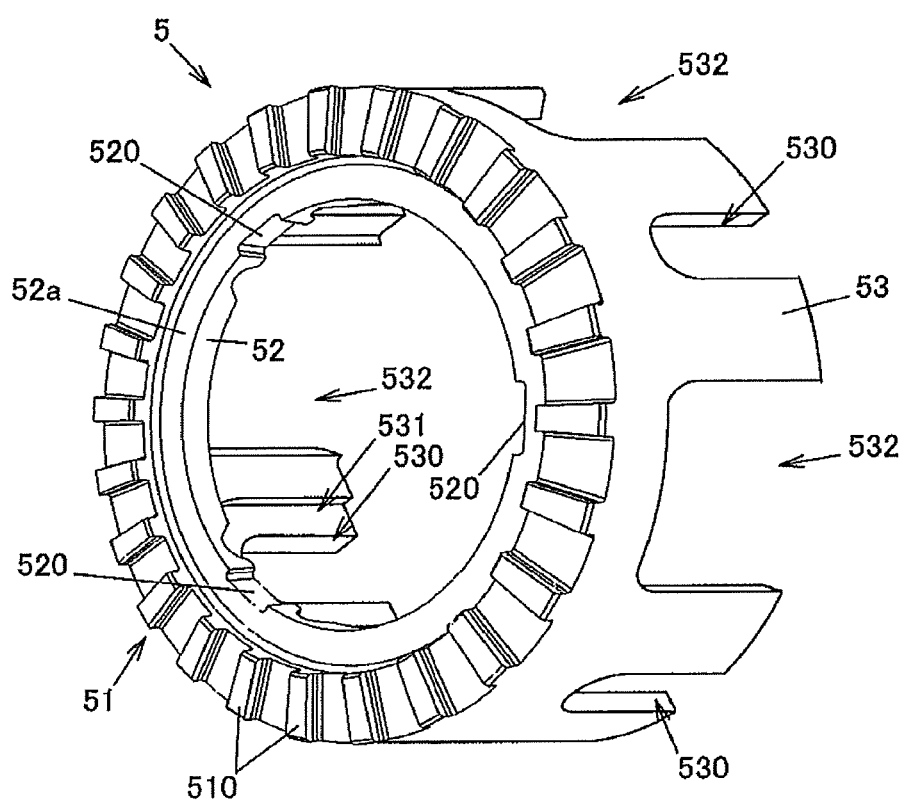
FIG. 3 is a perspective view illustrating a slide member of the differential apparatus.
Figure 4:
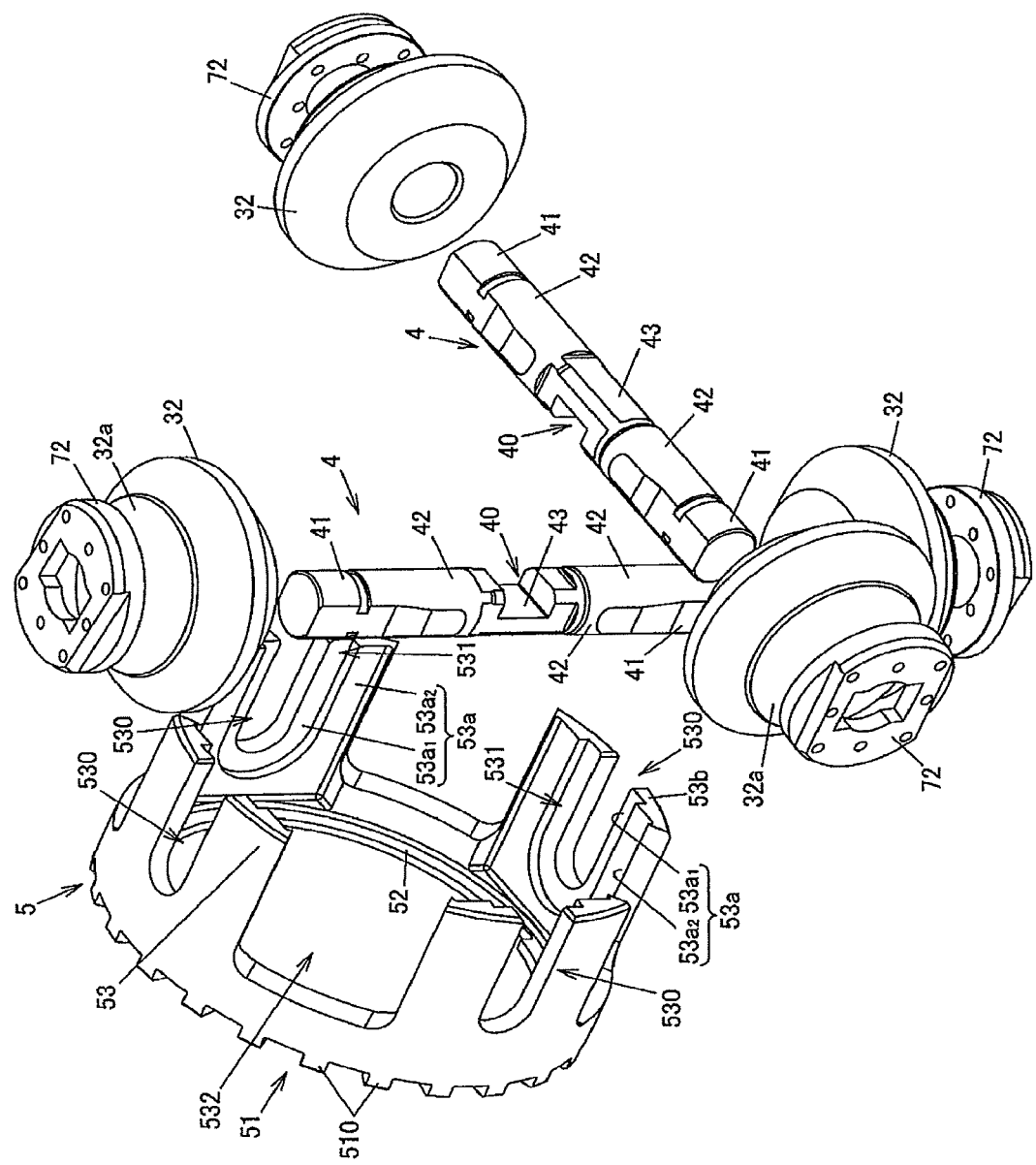
FIG. 4 is a perspective view illustrating a differential gear mechanism of the differential apparatus and components therearound.
Figure 5:
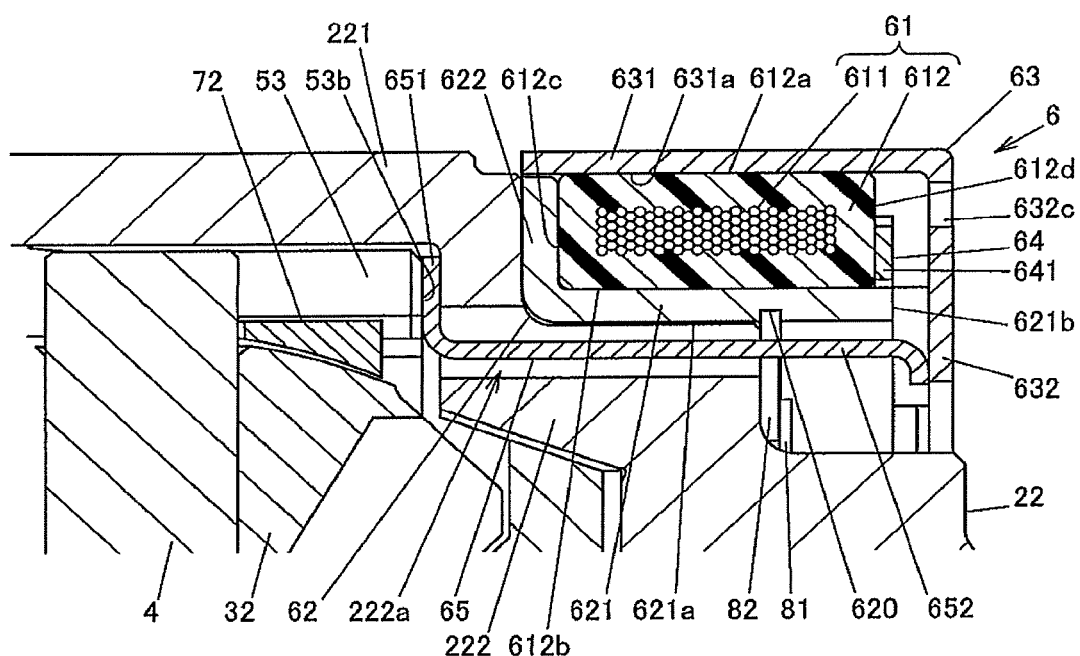
FIG. 5 is an enlarged cross-sectional view illustrating an actuator of the differential apparatus.
Figure 6A:
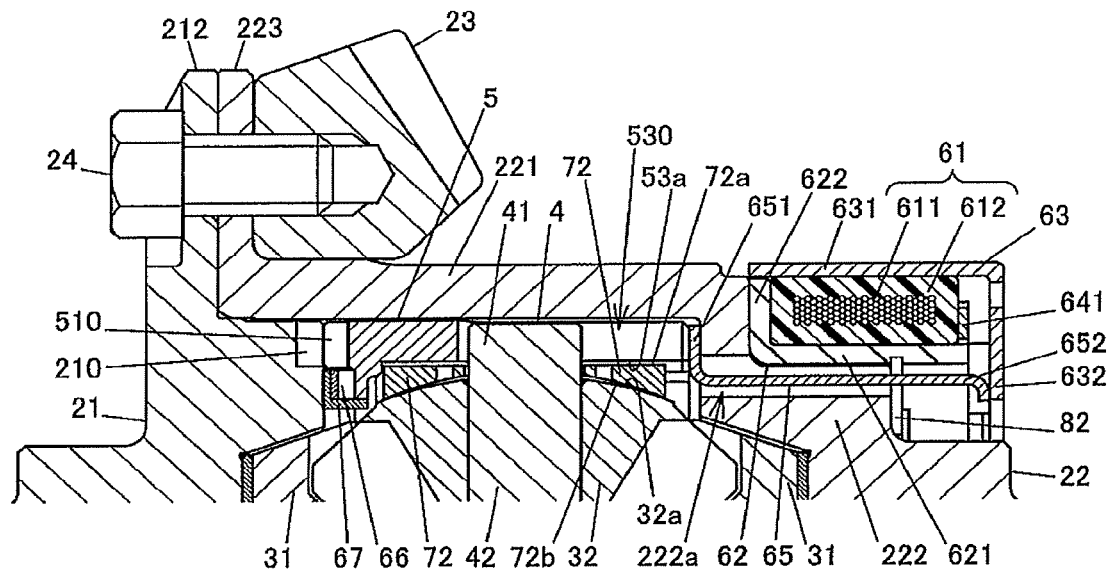
FIG. 6A is an explanatory diagram illustrating how the differential apparatus operates when the actuator is deactivated.
Figure 6B:
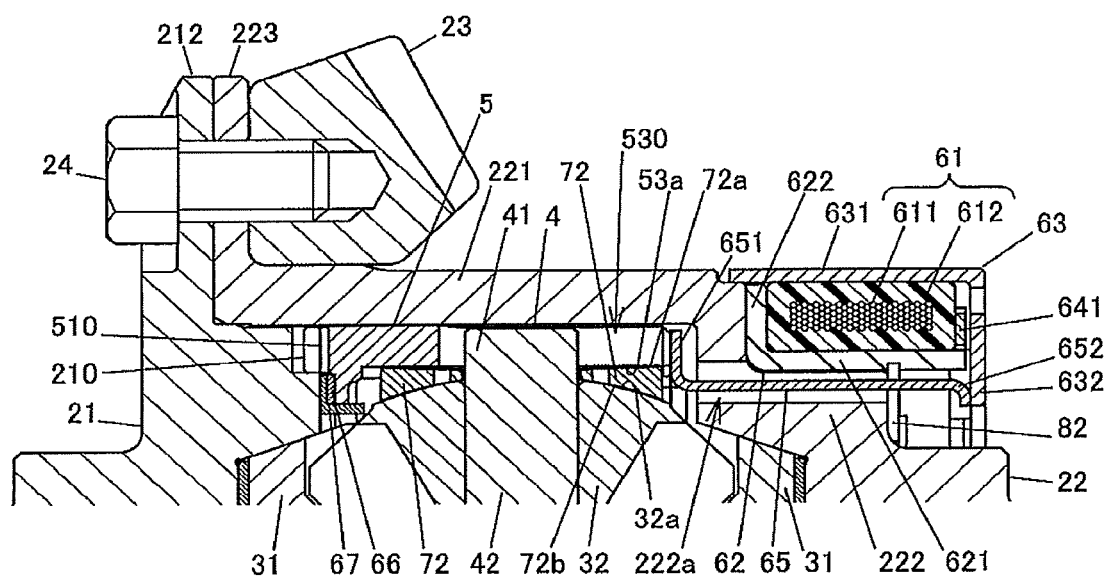
FIG. 6B is an explanatory diagram illustrating how the differential apparatus operates when the actuator is activated.

FIG. 1 is a cross-sectional view illustrating an exemplary configuration of a differential apparatus according to a first embodiment of the invention. FIG. 2 is an exploded perspective view illustrating the differential apparatus. FIG. 3 is a perspective view illustrating a slide member of the differential apparatus 1. FIG. 4 is a perspective view illustrating a differential gear mechanism of the differential apparatus, together with the slide member and a pinion shaft. FIG. 5 is an enlarged cross-sectional view illustrating an actuator of the differential apparatus. FIG. 6A is an explanatory diagram illustrating how the differential apparatus operates when the actuator is deactivated. FIG. 6B is an explanatory diagram illustrating how the differential apparatus operates when the actuator is activated.

A differential apparatus 1 is used to distribute a driving force of a vehicle driving source, such as an engine, to two output shafts, while allowing a difference in driving force. More specifically, the differential apparatus 1 according to this embodiment is mounted on a four-wheel-drive vehicle that has a pair of right and left main drive wheels (for example, front wheels) to which the driving force of the driving source is always transmitted, and a pair of right and left auxiliary drive wheels (for example, rear wheels) to which the driving force of the driving source is selectively transmitted depending on the traveling conditions. The differential apparatus 1 is used as a differential for distributing the driving force to the right and left auxiliary drive wheels. When the driving force is transmitted to only the main drive wheels, the vehicle operates in a two-wheel drive mode. When the driving force is transmitted to both the main drive wheels and the auxiliary drive wheels, the vehicle operates in a four-wheel drive mode. When the vehicle operates in a four-wheel drive mode, the differential apparatus 1 distributes an input driving force to right and left drive shafts for the auxiliary drive wheels.

The differential apparatus 1 includes a differential case 2 serving as a case member rotatably supported about a rotation axis O1 by a differential carrier (not illustrated), a differential gear mechanism 3 in which two side gears 31 mesh with a plurality of pinion gears 32 such that the gear axis of the side gears 31 is orthogonal to the gear axis of the pinion gears 32, pinion shafts 4 that rotatably supports the pinion gears 32, a hollow slide member 5 that supports the ends of the pinion shaft 4 and in which the differential gear mechanism 3 is disposed, an actuator 6 that moves the slide member 5 relative to the differential case 2 to one side in the rotation axis O1 direction, a biasing member 66 that biases the slide member 5 relative to the differential case 2 to the other side in the rotation axis O1 direction, side gear washers 71 each disposed between a corresponding one of the side gears 31 and the differential case 2, and pinion gear washers 72 each disposed between a corresponding one of the pinion gears 32 and the slide member 5.

The differential case 2 accommodates the slide member 5 such that the slide member 5 is relatively movable in the rotation axis O1 direction and is relatively rotatable. Lubricating oil is introduced in the differential case 2 to lubricate the differential gear mechanism 3 and the slide member 5.

The side gears 31 and the pinion gears 32 are bevel gears. The side gears 31 rotate about the rotation axis O1 of the differential case 2. In other words, the differential case 2 and the two side gears 31 share the rotation axis O1. The pinion gears 32 rotate about a rotation axis O2 extending in the longitudinal direction of the pinion shaft 4. The right and left drive shafts are respectively coupled to the two side gears 31 so as not to be rotatable relative thereto. Although not illustrated in FIGS. 2 and 4, the side gears 31 and the pinion gears 32 have a plurality of gear teeth.

In this embodiment, the differential gear mechanism 3 includes four pinion gears 32, and the four pinion gears 32 are rotatably supported by two pinion shafts 4. More specifically, two of the four pinion gears 32 are rotatably supported by one of the pinion shafts 4, and the other two of the pinion gears 32 are rotatably supported by the other pinion shaft 4.

As illustrated in FIG. 4, each pinion shaft 4 integrally includes two engaged portions 41 that are engaged with engaging portions 530 of the slide member 5, two pinion gear support portions 42 that are inserted through the pinion gears 32, and a connector 43 that connects the two pinion gear support portions 42 together. Each pinion shaft 4 has a shaft shape as a whole. The two engaged portions 41 are disposed at the opposite ends of the pinion shaft 4. The connector 43 is disposed at the center of the pinion shaft 4 in the axial direction thereof. Each of the two pinion gear support portions 42 is disposed between a corresponding one of the two engaged portions 41 and the connector 43, and rotatably supports a corresponding one of the pinion gears 32.

The two pinion shafts 4 engage each other at their centers in their axial directions. Specifically, the connector 43 of one of the pinion shafts 4 fits into a recess 40 formed between the two pinion gear support portions 42 of the other pinion shafts 4, while the connector 43 of the other pinion shafts 4 fits into a recess 40 formed between the two pinion gear support portions 42 of the one of the pinion shafts 4. The two pinion shafts 4 are orthogonal to each other to form a cross shape as viewed along the rotation axis O1.

The slide member 5 has a cylindrical shape having a central axis that coincides with the rotation axis O1 of the differential case 2, and serves as a pinion shaft support member that supports the pinion shafts 4. The slide member 5 is formed by forging a steel material. As illustrated in FIG. 3, the slide member 5 integrally includes a first meshing portion 51 that is disposed at one end thereof in the central axial direction and that has a plurality of meshing teeth 510, an annular inner rib portion 52 projecting inward from the first meshing portion 51, and a cylindrical portion 53 having the engaging portions 530 that engage the pinion shafts 4 in the circumferential direction. The first meshing portion 51 meshes with a second meshing portion 211 (described below) of the differential case 2 in the circumferential direction. Each of the engaging portions 530 extends through the inner and outer peripheral surfaces of the cylindrical portion 53, and is formed as a cutout groove extending in parallel to the central axis direction of the slide member 5.

The engaging portions 530 engage the engaged portions 41 disposed at the ends of the pinion shafts 4. The engaged portions 41 of the pinion shafts 4 are engaged with the engaging portions 530 of the slide member 5 such that the slide member 5 is movable in the central axis direction relative to the pinion gears 32 rotatably supported by the pinion shafts 4, but is not rotatable relative to the pinion gears 32. The pinion gears 32 rotate about the rotation axis O1 of the differential case 2, together with the slide member 5. In this embodiment, the cylindrical portion 53 has four engaging portions 530 such that all the engaged portions 41 disposed at the ends of the two pinion shafts 4 are engaged with the slide member 5.

The cylindrical portion 53 has recesses 531 around the respective four engaging portions 530. The recesses 531 are recessed in the radial direction perpendicular to the rotation axis O1. The recesses 531 have a U shape as viewed from the inner side of the cylindrical portion 53. An inner surface 53a of the cylindrical portion 53 facing the pinion gear washer 72 includes first inner surfaces $53a_1$ defining the bottom surface of the recesses 531 and second inner surfaces $53a_2$ in which the recesses 531 are not formed. Each of the first inner surfaces $53a_1$ and the second inner surfaces $53a_2$ is a plane orthogonal to the axial direction of the pinion shaft 4 that engages the corresponding engaging portion 530. A stepped surface $53a_3$ is formed between each of the first inner surfaces $53a_1$ and the second inner surfaces $53a_2$. The stepped surface $53a_3$ is perpendicular to the first inner surface $53a_1$ and the second inner surface $53a_2$.

The cylindrical portion 53 of the slide member 5 has a plurality of openings 532 through which lubricating oil flows. In this embodiment, the cylindrical portion 53 has four openings 532 that are formed at equal intervals in the circumferential direction of the cylindrical portion 53. Each of the openings 532 extends through the cylindrical portion 53 in the radial direction, and has an open end that is remote from the first meshing portion 51. The number and shape of the openings 532 are not limited thereto, and may be appropriately changed. Alternatively, the slide member 5 may have no opening 532.

The inner rib portion 52 of the slide member 5 has an annular receiving surface 52a that receives a biasing force of the biasing member 66 (described below). The inner rib portion 52 further has a plurality of fitting portions 520 into which a plurality of projections 671 (see FIG. 2) of a holding member 67 that holds the biasing member 66 is fitted. The fitting portions 520 are recessed in the receiving surface 52a.

The actuator 6 includes an annular electromagnet 61 having a coil winding 611 and a mold resin portion 612 that encapsulates the coil winding 611, a yoke 62 serving as a magnetic path for magnetic flux that is generated by the electromagnet 61 upon energization of the coil winding 611, an armature 63 that slidably contacts the mold resin portion 612 and is guided in the rotation axis O1 direction of the differential case 2, a stopper ring 64 fixed to the yoke 62, and a pressing member 65 disposed between the armature 63 and the slide member 5.

With a magnetic force generated by energization of the coil winding 611, the armature 63 moves the slide member 5 via the pressing member 65 in such a direction that the first meshing portion 51 meshes with the second meshing portion 211 of the differential case 2. With the moving force of the armature 63 transmitted via the pressing member 65, the slide member 5 moves in the rotation axis O1 direction, so that the first meshing portion 51 meshes with the second meshing portion 211. When the first meshing portion 51 meshes with the second meshing portion 211, the slide member 5 is restricted from rotating relative to the differential case 2.

The coil winding 611 is supplied with an exciting current via an electric wire 610 (see FIG. 2) from a control unit (not illustrated). When the exciting current is supplied to the coil winding 611, the actuator 6 is activated. The yoke 62 is made of a soft magnetic metal such as low-carbon steel. The yoke 62 integrally includes a cylindrical portion 621 that covers an inner peripheral surface 612b of the mold resin portion 612 from the inner side, and a rib portion 622 projecting outward from an axial end portion of the cylindrical portion 621 and covering an axial end face 612c of the mold resin portion 612. The inner diameter of the cylindrical portion 621 is slightly greater than the outer diameter of a portion of the differential case 2 facing an inner peripheral surface 621a of the cylindrical portion 621.

The inner peripheral surface 621a of the cylindrical portion 621 has an annular recess 620 into which a plurality of (three in this embodiment) plates 82 fit. The plates 82 are made of a non-magnetic material and are fixed to the differential case 2 by press-in pins 81. When the plates 82 fit into the annular recess 620, the yoke 62 is restricted from moving relative to the differential case 2 in the axial direction. The axial width of the annular recess 620 is greater than the thickness of the plates 82 to prevent a rotational resistance to the yoke 62 from being generated when the differential case 2 rotates.

The stopper ring 64 is fixed to an end of the cylindrical portion 621 of the yoke 62 on the side opposite to the rib portion 622, for example, by welding. The stopper ring 64 is made of a non-magnetic metal such as austenite stainless steel. The stopper ring 64 integrally includes an annular portion 641 fixed to the yoke 62, two projections 642 projecting in the axial direction from the annular portion 641 at two positions in the circumferential direction, and folded-back portions 643 that are folded back at an acute angle from the distal ends of the respective projections 642. The two projections 642 are engaged with the differential carrier (not illustrated) to prevent rotation of the stopper ring 64.

The pressing member 65 includes an annular portion 651 that abuts an axial end face 53b of the cylindrical portion 53 of the slide member 5 on the side opposite to the first meshing portion 51, and a plurality of arms 652 extending from the annular portion 651 in parallel to the rotation axis O1 of the differential case 2. In this embodiment, the pressing member 65 includes three arms 652. The pressing member 65 is formed by pressing a steel plate, and the distal end of each arm 652 (the end opposite to the base end adjacent to the annular portion 651) is bent inward.

The armature 63 is made of a soft magnetic metal such as low-carbon steel. The armature 63 integrally includes an outer annular portion 631 having an annular shape and disposed on the outer periphery of the electromagnet 61, and a side plate portion 632 facing the electromagnet 61 in the axial direction. The outer annular portion 631 has a cylindrical shape to cover the outer periphery of the electromagnet 61. The side plate portion 632 projects inward from an axial end of the outer annular portion 631. The side plate portion 632 faces an axial end face 612d of the mold resin portion 612 in the axial direction (an end face opposite to the axial end face 612c facing the rib portion 622 of the yoke 62), the annular portion 641 of the stopper ring 64, and an axial end face 621b of the cylindrical portion 621 of the yoke 62, in the axial direction.

An inner peripheral surface 631a of the outer annular portion 631 of the armature 63 is in contact with an outer peripheral surface 612a of the mold resin portion 612 such that the armature 63 is supported by the electromagnet 61. When the armature 63 moves in the axial direction, the inner peripheral surface 631a of the outer annular portion 631 slides on the outer peripheral surface 612a of the mold resin portion 612.

As illustrated in FIG. 2, the side plate portion 632 of the armature 63 has engagement holes 632a that engage the projections 642 of the stopper ring 64, a wire insertion hole 632b through which the electric wire 610 is inserted, and a plurality of (nine in the example illustrated in FIG. 2) oil holes 632c through which lubricating oil flows. The distal ends of the arms 652 of the pressing member 65 abut the inner peripheral edge portion of the side plate portion 632. The folded-back portions 643 of the stopper ring 64 prevent the armature 63 from being detached from the stopper ring 64. The projections 642 engage the engagement holes 632a to prevent the armature 63 from rotating relative to the differential carrier. The projections 642 of the stopper ring 64 are inserted through the engagement holes 632a and are engaged with the differential carrier.

The differential case 2 is formed by coupling a first case member 21 and a second case member 22 that are aligned in the rotation axis O1 direction. The second case member 22 has a bottomed cylindrical shape and accommodates the differential gear mechanism 3 and the slide member 5. The second case member 22 integrally includes a cylindrical portion 221 having a cylindrical shape, a wall portion 222 projecting inward from one end of the cylindrical portion 221 that is remote from the end adjacent to the first case member 21, and a flange portion 223 projecting outward from the other end of the cylindrical portion 221. The electromagnet 61 and the yoke 62 are disposed at a corner between the cylindrical portion 221 and the wall portion 222.

The cylindrical portion 221 has a plurality of oil holes 221a through which lubricating oil flows. The wall portion 222 has a plurality of (three in this embodiment) insertion holes 222a through which the arms 652 of the pressing member 65 are inserted, and a shaft insertion hole 222b for inserting a drive shaft that is coupled to one of the two side gears 31 so as not to be rotatable relative thereto. The insertion holes 222a and the shaft insertion hole 222b extend through the wall portion 222 in the direction parallel to the rotation axis O1.

The first case member 21 is formed by forging, for example, and has a disc shape that covers an opening of the second case member 22. The first case member 21 integrally includes the second meshing portion 211 having a plurality of meshing teeth 210, and a flange portion 212 that abuts the flange portion 223 of the second case member 22. The second meshing portion 211 is disposed to face the first meshing portion 51 in the central axial direction of the slide member 5. The slide member 5 is disposed between the second meshing portion 211 of the first case member 21 and the wall portion 222 of the second case member 22. The first case member 21 has a shaft insertion hole 21a for inserting a drive shaft that is coupled to the other of the two side gears 31 so as not to be rotatable relative thereto.

A driving force from a ring gear 23 (see FIG. 1) as an input gear is input to the differential case 2. The ring gear 23 is fixed to the flange portions 212 and 223 of the first and second case members 21 and 22. In this embodiment, the flange portion 212 of the first case member 21 has a plurality of bolt insertion holes 212a, and the flange portion 223 of the second case member 22 has a plurality of bolt insertion holes 223a. The ring gear 23 is fixed to the differential case 2 by fastening bolts 24 respectively inserted through the bolt insertion holes 212a and 223a such that the ring gear 23 rotates with the differential case 2. Each of the fastening bolts 24 has a head 241 and a shaft 242 with an external thread. The head 241 abuts the flange portion 212 of the first case member 21, and the shaft 242 is inserted through the bolt insertion holes 212a and 223a. Thus, the fastening bolt 24 is screwed into a threaded hole 23a in the ring gear 23.

The first case member 21 and the second case member 22 are coupled by a plurality of coupling bolts 25 (see FIG. 2). In this embodiment, the first case member 21 and the second case member 22 are coupled by four coupling bolts 25 before the ring gear 23 is fastened. FIG. 2 illustrates three of the coupling bolts 25. The coupling bolts 25 are inserted through bolt insertion holes 223b in the flange portion 223 of the second case member 22, and are screwed into threaded holes 212b in the first case member 21.

The biasing member 66 that is an elastic body and the holding member 67 that holds the biasing member 66 are disposed between the first case member 21 and the inner rib portion 52 of the slide member 5. The holding member 67 includes an annular body 670 and three projections 671 extending from the body 670 toward the wall portion 222 of the second case member 22. The projections 671 are fitted into the fitting portions 520 of the inner rib portion 52 of the slide member 5 to prevent the holding member 67 from rotating relative to the slide member 5.

The biasing member 66 is compressed in the central axis direction of the slide member 5 by operation of the actuator 6. The slide member 5 is biased toward the wall portion 222 of the second case member 22 by a restoring force (a biasing force) of the biasing member 66. The biasing member 66 is, for example, a wave washer. Alternatively, the biasing member 66 may be a disc spring or a coil spring, or may be made of rubber.

Next, the operation of the differential apparatus 1 will be described with reference to FIGS. 6A and 6B. FIG. 6A is a partial cross-sectional view illustrating the differential apparatus 1 with the actuator 6 deactivated. FIG. 6B is a partial cross-sectional view illustrating the differential apparatus 1 with the actuator 6 activated.

The differential apparatus 1 switches between a coupled state and a decoupled state in accordance with whether the actuator 6 is activated or deactivated. In the coupled state, the first meshing portion 51 and the second meshing portion 211 mesh with each other in the circumferential direction, and thus the slide member 5 and the differential case 2 are coupled so as not to be rotatable relative to each other. In the decoupled state, the slide member 5 and the differential case 2 are decoupled so as to be rotatable relative to each other.

The actuator 6 is deactivated when no exciting current is supplied to the coil winding 611 of the electromagnet 61. When the actuator 6 is deactivated, the slide member 5 is moved toward the wall portion 222 of the second case member 22 by the restoring force of the biasing member 66, so that the first meshing portion 51 and the second meshing portion 211 are disengaged. That is, when the actuator 6 is deactivated, the differential case 2 and the slide member 5 can rotate relative to each other, and therefore the transmission of the driving force from the differential case 2 to the differential gear mechanism 3 is blocked. Thus, the driving force that is input to the differential case 2 from the ring gear 23 is not transmitted to the drive shafts, so that the vehicle operates in a two-wheel drive mode.

When an exciting current is supplied to the coil winding 611 of the electromagnet 61, the armature 63 is moved in the axial direction by the magnetic force of the electromagnet 61 such that the side plate portion 632 of the armature 63 approaches the axial end face 621b of the cylindrical portion 621 of the yoke 62. Thus, the pressing member 65 presses the slide member 5 toward the first case member 21, so that the first meshing portion 51 and the second meshing portion 211 mesh with each other.

When the first meshing portion 51 and the second meshing portion 211 mesh with each other, the driving force that is input from the ring gear 23 to the first case member 21 of the differential case 2 is transmitted to the drive shafts via the slide member 5, the two pinion shafts 4, the four pinion gears 32, and the two side gears 31. Thus, the vehicle operates in a four-wheel drive mode.

Figure 7C:
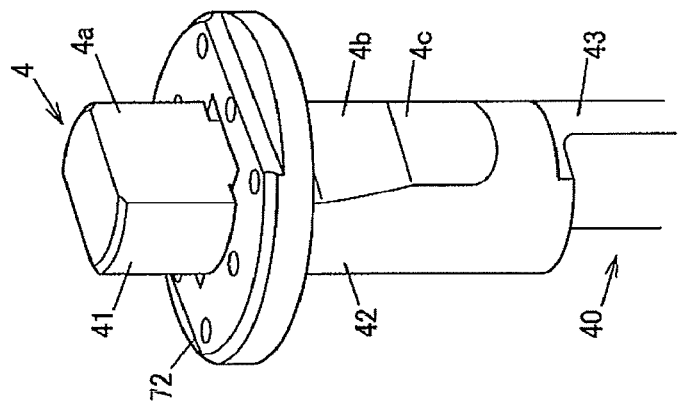
FIG. 7C is an explanatory diagram illustrating the procedure for attaching a pinion gear washer to a pinion shaft.
Figure 7B:
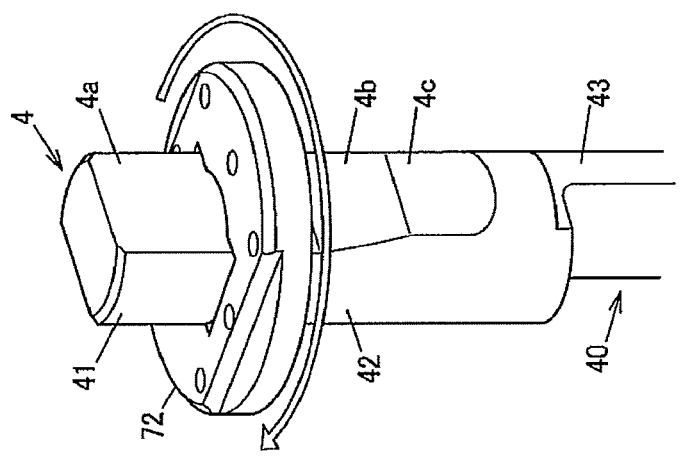
FIG. 7B is an explanatory diagram illustrating the procedure for attaching a pinion gear washer to a pinion shaft.
Figure 7A:
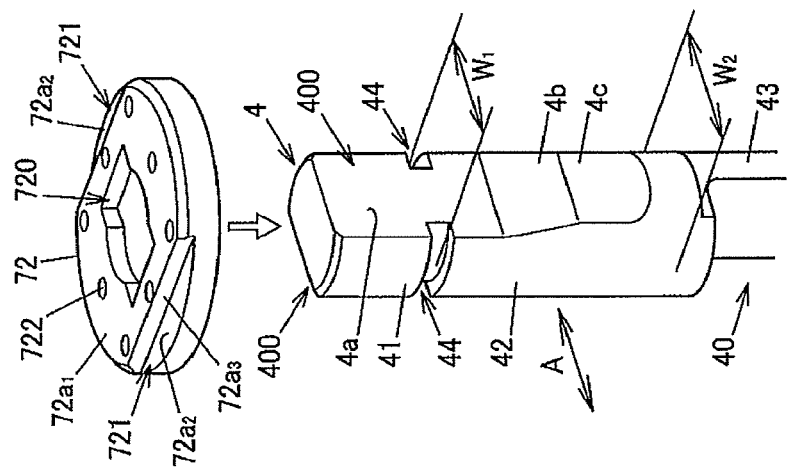
FIG. 7A is an explanatory diagram illustrating a procedure for attaching a pinion gear washer to a pinion shaft.

Next, the configuration of the pinion gear washer 72 and the attachment structure of the pinion gear washer 72 to the pinion shaft 4 will be described with reference to FIGS. 7A to 7C and FIG. 8. Although FIGS. 7A to 7C illustrate only one pinion gear washer 72 that is attached to an end of one of the two pinion shafts 4, the other three pinion gear washers 72 are attached to their corresponding pinion shafts 4 in the same manner. The pinion gear washer 72 corresponds to a "washer" of the invention. In the following description, the axial direction refers to the direction (the rotation axis O2 direction) along the longitudinal direction of the pinion shaft 4.

Figure 8:
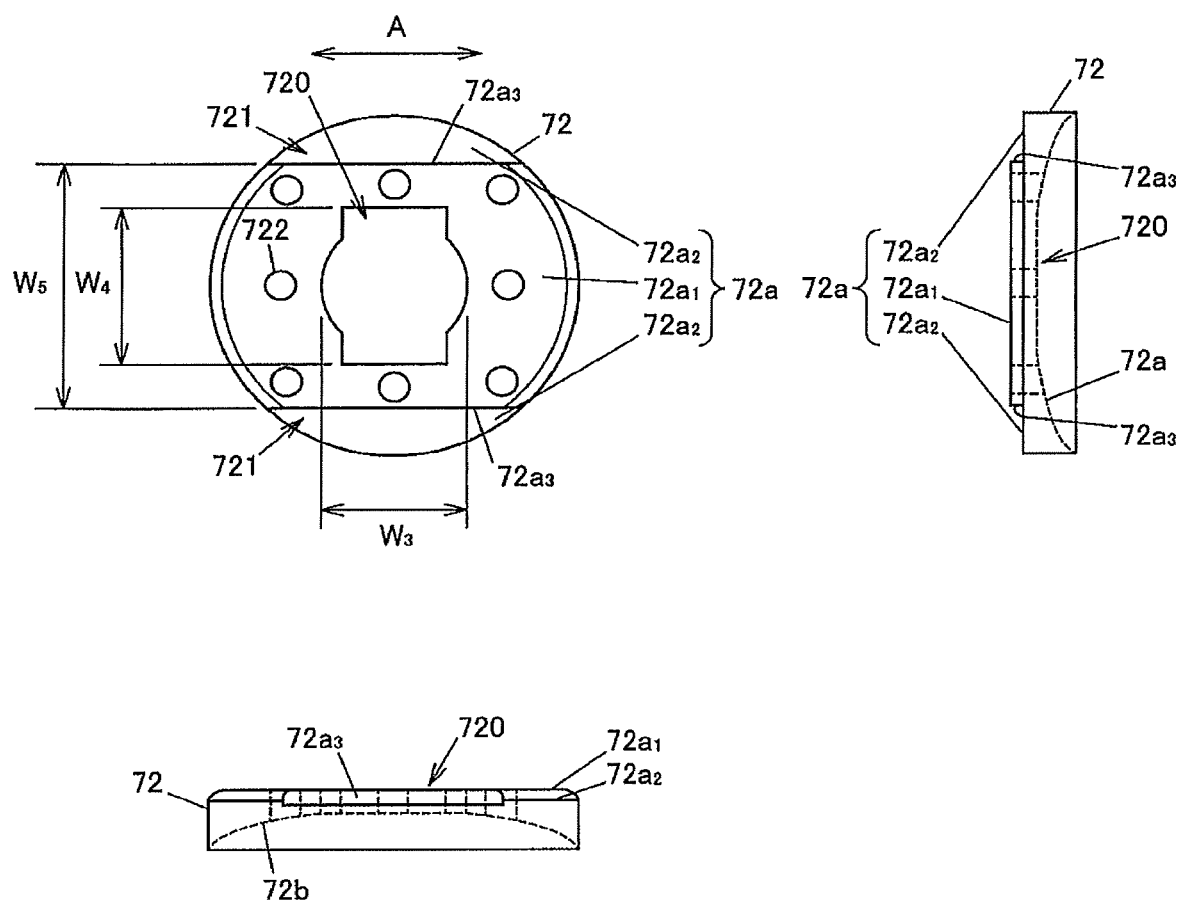
FIG. 8 is an orthographic drawing illustrating the pinion gear washer.

FIGS. 7A to 7C are explanatory diagrams illustrating a procedure for attaching the pinion gear washer 72 to the pinion shaft 4. FIG. 8 is an orthographic drawing illustrating the pinion gear washer 72. In FIGS. 7A to 7C and FIG. 8, the moving direction of the slide member 5 parallel to the rotation axis O1 is indicated by the arrow A. The pinion gear washer 72 has a disc shape as viewed in the axial direction, and has an insertion hole 720 at the center thereof through which the pinion shaft 4 is inserted.

The pinion shaft 4 has two engagement grooves 44 with which the pinion gear washer 72 engages. The engagement grooves 44 are formed between the engaged portion 41 and the pinion gear support portion 42. Further, the pinion shaft 4 has two thin portions 400, one on each side thereof in the direction perpendicular to the rotation axis O1, to reduce the thickness in that direction. Each of the thin portions 400 extends across the engaged portion 41 and the pinion gear support portion 42. The pinion shaft 4 has a width across flat shape at the portion where the thin portions 400 are formed. Hereinafter, with regard to the pinion shaft 4, the direction parallel to the rotation axis O1 is referred to as a long diameter direction, and the direction perpendicular to the rotation axis O1 and the rotation axis O2 is referred to as a short diameter direction. The engaged portions 41 of the pinion shaft 4 are engaged with the engaging portions 530 of the slide member 5 such that the long diameter direction of the pinion shaft 4 coincides with the extending direction of the engaging portions 530. Thus, the pinion shaft 4 is prevented from rotating relative to the slide member 5.

The pinion shaft 4 includes, at each of the side surfaces in the direction perpendicular to the rotation axis O1 at the portion where the thin portions 400 are formed, a first side surface 4a at the portion where the reduction in thickness is greater, a third side surface 4c at the portion where the reduction in thickness is smaller, and a second side surface 4b at the portion where the thickness gradually increases from the first side surface 4a toward the third side surface 4c. The two engagement grooves 44 are formed at the portion where the reduction in thickness is greater. The opposite ends of each engagement groove 44 in the extending direction along the circumferential direction of the pinion shaft 4 are open to the first side surfaces 4a.

A width W1 between the groove bottom surfaces of the two engagement grooves 44 of the pinion shaft 4 in the moving direction of the slide member 5 (the arrow A direction) is less than a width W2 of the portion where the engagement grooves 44 are not formed in that direction. The width W2 corresponds to the diameter of the pinion shaft 4 at the portion where the thin portions 400 are not formed.

As for the insertion hole 720 of the pinion gear washer 72, a width W3 in the moving direction of the slide member 5 attached to the pinion shaft 4 is slightly greater than the width W1 between the groove bottom surfaces of the two engagement grooves 44 of the pinion shaft 4, and a width W4 in the direction orthogonal to the moving direction of the slide member 5 is slightly greater than the width W2 of the portion of the pinion shaft 4 where the engagement grooves 44 are not formed. The width W3 of the insertion hole 720 of the pinion gear washer 72 is less than the width W2 of the pinion shaft 4. Hereinafter, with regard to the pinion gear washer 72, the direction of the width W4 is referred to as a long diameter direction, and the direction of the width W3 is referred to as a short diameter direction. The short diameter direction of the pinion gear washer 72 corresponds to the moving direction of the slide member 5 attached to the pinion shaft 4.

The pinion gear washer 72 has two thin portions 721, one on each end in the long diameter direction thereof. The thickness of the pinion gear washer 72 in the axial direction is reduced at the thin portions 721. The thin portions 721 are formed at the surface of the pinion gear washer 72 facing the inner surface 53a of the cylindrical portion 53 of the slide member 5 in the axial direction. The surface of the pinion gear washer 72 facing the inner surface 53a is hereinafter referred to as an outer surface 72a of the pinion gear washer 72.

The outer surface 72a of the pinion gear washer 72 includes a first outer surface $72a_1$ at the portion where the thin portions 721 are not formed, and two second outer surfaces $72a_2$ at the portion where the two respective thin portions 721 are formed. The insertion hole 720 is open to the first outer surface $72a_1$. A stepped surface $72a_3$ is formed between the first outer surface $72a_1$ and each of the two second outer surfaces $72a_2$. The stepped surfaces $72a_3$ are parallel to each other. A portion of the pinion gear washer 72 between the two stepped surfaces $72a_3$ forms a width across flat projection projecting from the two second outer surfaces $72a_2$ in the axial direction.

The pinion gear washer 72 has a plurality of oil holes 722 that are open to the first outer surface $72a_1$, around the insertion hole 720. The oil holes 722 extend through the pinion gear washer 72 in the axial direction, and through which lubricating oil flows. In this embodiment, the pinion gear washer 72 has eight oil holes 722.

An inner surface 72b of the pinion gear washer 72 opposite to the outer surface 72a faces a back surface 32a of the pinion gear 32. In this embodiment, the back surface 32a of the pinion gear 32 has a partially convex spherical shape, and the inner surface 72b of the pinion gear washer 72 has a partially concave spherical shape with a curvature radius smaller than that of the back surface 32a of the pinion gear 32.

The pinion gear washer 72 having the configuration described above is attached to the pinion shaft 4 in the following manner. As illustrated in FIG. 7A, the long diameter direction of the pinion shaft 4 and the long diameter direction of the pinion gear washer 72 are made to coincide with each other, and the pinion shaft 4 and the pinion gear washer 72 are moved relative to each other in the axial direction. As illustrated in FIG. 7B, when the inner surface of the insertion hole 720 of the pinion gear washer 72 is moved to a position facing the engagement grooves 44 of the pinion shaft 4, the pinion shaft 4 and the pinion gear washer 72 are rotated relative to each other by a predetermined angle (90°) such that the long diameter direction of the pinion shaft 4 and the short diameter direction of the pinion gear washer 72 coincide with each other as illustrated in FIG. 7C. Thus, the peripheral portion of the insertion hole 720 of the pinion gear washer 72 engages the two engagement grooves 44, so that the pinion gear washer 72 is restricted from moving in the axial direction of the pinion shaft 4.

In other words, when the inner peripheral edge (the peripheral portion of the insertion hole 720) of the pinion gear washer 72 is engaged with the engagement grooves 44 that are formed as recesses in the pinion shaft 4, movement of the pinion gear washer 72 toward the engaged portion 41 (toward the slide member 5) and toward the pinion gear support portion 42 (toward the pinion gear 32) is restricted. Further, when the pinion gear washer 72 is rotated relative to the pinion shaft 4 by the predetermined angle, the inner peripheral edge of the pinion gear washer 72 is engaged with the engagement grooves 44.

The portion of the pinion gear washer 72 where the thin portions 721 are not formed fits into the recess 531 of the slide member 5, so that the pinion gear washer 72 is prevented from rotating and being disengaged from the engagement grooves 44 of the pinion shaft 4. The first outer surface $72a_1$ of the pinion gear washer 72 faces the first inner surface $53a_1$ of the slide member 5, and the second outer surfaces $72a_2$ face the second inner surface $53a_2$ of the slide member 5. The stepped surfaces $72a_3$ of the pinion gear washer 72 face the stepped surface $53a_3$ of the slide member 5 with a small clearance therebetween. That is, the portion of the pinion gear washer 72 where the thin portions 721 are not formed is loosely fitted in the recess 531 of the slide member 5. With this configuration, the pinion gear washer 72 is restricted by the slide member 5 from rotating relative to the pinion shaft 4.

The pinion gear washer 72 has elasticity to be elastically deformable by a pressing force applied from the pinion gear 32 in the axial direction while the vehicle is traveling. The pinion gear 32 presses the pinion gear washer 72 toward the cylindrical portion 53 of the slide member 5 with a meshing reaction force from the side gears 31 and a centrifugal force.

Figure 9A:
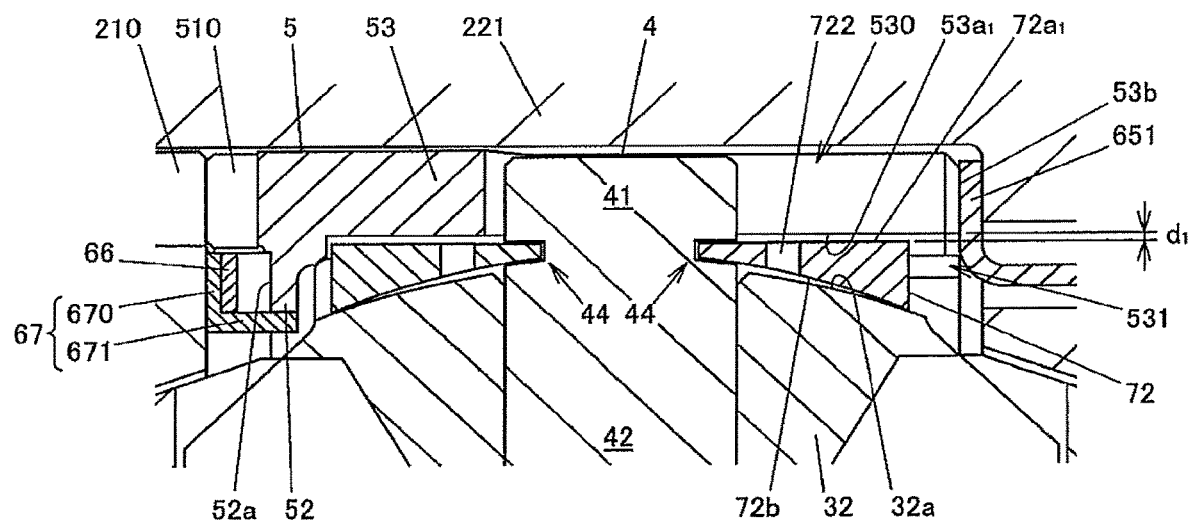
FIG. 9A is a cross-sectional view illustrating the pinion gear washer installed in a differential case and components therearound, in which the pinion gear washer is in a natural state before deformation.
Figure 9B:
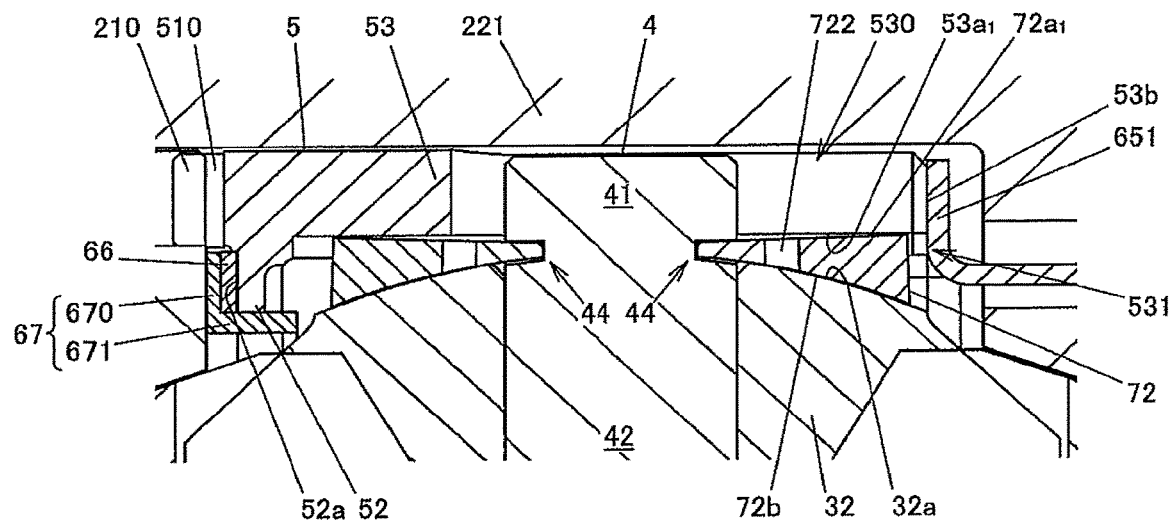
FIG. 9B is a cross-sectional view illustrating the pinion gear washer installed in the differential case and components therearound, in which the pinion gear washer is in a deformed state.

FIGS. 9A and 9B are cross-sectional views illustrating the pinion gear washer 72 installed in the differential case 2 and components therearound. FIG. 9A illustrates the pinion gear washer 72 in a natural state before deformation, and FIG. 9B illustrates the pinion gear washer 72 in a deformed state. When the pinion gear washer 72 is in a natural state, the outer surface 72a of the pinion gear washer 72 and the inner surface 53a of the cylindrical portion 53 of the slide member 5 face parallel to each other as illustrated in FIG. 9A. A predetermined clearance is formed between the first outer surface $72a_1$ and the first inner surface $53a_1$ of the slide member 5, and between the second outer surfaces $72a_2$ and the second inner surface $53a_2$ of the slide member 5. An axial distance dl of the predetermined clearance is, for example, in a range from 0.1 to 1.0 mm.

In the case where the slide member 5 and the differential case 2 is coupled so as not to be rotatable relative to each other, when the differential case 2 is rotated by a driving force applied from the ring gear 23, the pinion gear 32 presses the pinion gear washer 72 toward the cylindrical portion 53 of the slide member 5 with a meshing reaction force from the side gears 31 and a centrifugal force, so that the pinion gear washer 72 is elastically deformed. When the pressing force becomes greater than or equal to a predetermined value, the outer surface 72a of the pinion gear washer 72 abuts the inner surface 53a of the cylindrical portion 53 of the slide member 5 as illustrated in FIG. 9B. More specifically, at the radially outer edge of the pinion gear washer 72, the first outer surface $72a_1$ abuts the first inner surface $53a_1$ of the slide member 5, and the second outer surfaces $72a_2$ abut the second inner surface $53a_2$ of the slide member 5.

In the manner described above, when the force of the pinion gear 32 pressing the pinion gear washer 72 toward the cylindrical portion 53 of the slide member 5 is less than the predetermined value, the predetermined clearance is formed between the inner surface 53a of the slide member 5 and the outer surface 72a of the pinion gear washer 72. When the force of the pinion gear 32 pressing the pinion gear washer 72 toward the cylindrical portion 53 of the slide member 5 is greater than or equal to the predetermined value, the outer surface 72a of the pinion gear washer 72 abuts the inner surface 53a of the slide member 5.

According to the first embodiment of the invention described above, the meshing reaction force from the side gears 31 and the centrifugal force applied to the pinion gear 32 are not directly transmitted to the slide member 5, but are received by the pinion gear washer 72 engaged on the pinion shaft 4. More specifically, when the force of the pinion gear 32 pressing the pinion gear washer 72 toward the cylindrical portion 53 of the slide member 5 is less than the predetermined value, the entire pressing force is received by the pinion gear washer 72, and is not transmitted to the slide member 5. Even when the force of the pinion gear 32 pressing the pinion gear washer 72 toward the cylindrical portion 53 of the slide member 5 is greater than or equal to the predetermined value, part of the pressing force is received by the pinion gear washer 72, so that the pressing force transmitted to the slide member 5 is reduced.

Accordingly, compared to the case where the pinion gear washer 72 is not engaged on the pinion shaft 4, the pressing force applied to the slide member 5 from the pinion gear 32 is reduced. Thus, even when the mechanical strength of the cylindrical portion 53 of the slide member 5 is reduced, for example, by reducing the thickness thereof, deformation of the cylindrical portion 53 can be reduced. Therefore, the weight of the slide member 5 can be reduced. Further, the inner diameter of the differential case 2 can be reduced by reducing the thickness of the cylindrical portion 53 of the slide member 5. Therefore, the size and weight of the differential case 2 can also be reduced. Accordingly, it is possible to reduce the weight of the differential apparatus 1.

Further, according to the first embodiment described above, when the force of the pinion gear 32 pressing the pinion gear washer 72 is greater than or equal to the predetermined value, the pinion gear washer 72 is elastically deformed, and the outer surface 72a abuts the inner surface 53a of the slide member 5, thereby preventing an excessively large load from being imposed on the pinion gear washer 72. Therefore, the thickness of the pinion gear washer 72 can reduced. This also makes it possible to reduce the weight of the differential apparatus 1.

Further, the inner peripheral edge of the pinion gear washer 72 is engaged with the engagement grooves 44. Therefore, it is possible to restrict the pinion gear washer 72 from moving relative to the pinion shaft 4 in the axial direction, without increasing the number of components. Furthermore, when the pinion gear washer 72 is rotated relative to the pinion shaft 4 by the predetermined angle, the pinion gear washer 72 is engaged with the engagement grooves 44, and is prevented by the slide member 5 from rotating. Therefore, it is possible to maintain engagement with the pinion shaft 4, without additional components for preventing rotation of the pinion gear washer 72.

Next, a second embodiment will be described with reference to FIGS. 10A to 10C. This embodiment is different from the first embodiment in the configuration of the pinion gear washer 72 and the attachment structure to the pinion shaft 4.

Figure 10A:
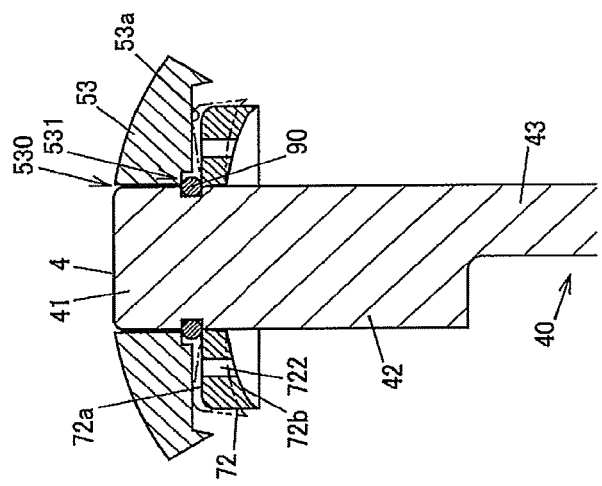
FIG. 10A is an exploded perspective view illustrating a pinion gear washer and a pinion shaft, together with a stopper member, according to a second embodiment of the invention.
Figure 10B:
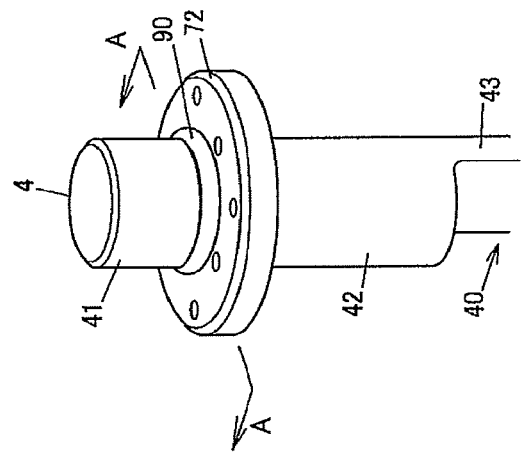
FIG. 10B is a perspective view illustrating the pinion shaft with the pinion gear washer and the stopper member attached thereto, according to the second embodiment of the invention.
Figure 10C:
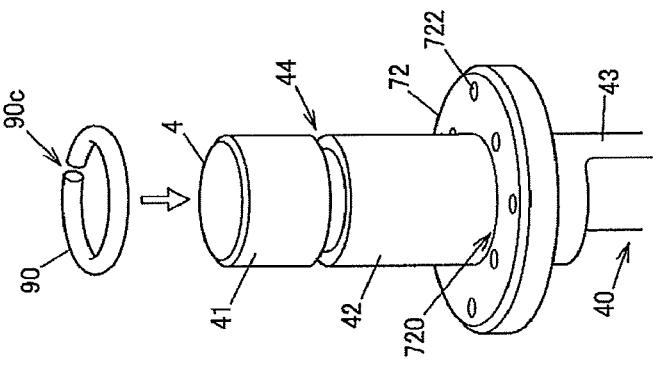
FIG. 10C is a cross-sectional view taken along the line A-A of FIG. 10B, illustrating the pinion shaft, the pinion gear washer, and the stopper member, together with a cylindrical portion of a slide member, according to the second embodiment of the invention.

FIG. 10A is an exploded perspective view illustrating a pinion gear washer 72 and a pinion shaft 4 according to this embodiment, together with a stopper member 90 that restricts movement of the pinion gear washer 72 toward an engaged portion 41. FIG. 10B is a perspective view illustrating the pinion shaft 4 with the pinion gear washer 72 and the stopper member 90 attached thereto. FIG. 10C is a cross-sectional view taken along the line A-A of FIG. 10B, illustrating the pinion shaft 4, the pinion gear washer 72, and the stopper member 90, together with a cylindrical portion 53 of a slide member 5.

In the first embodiment, two thin portions 400 are formed on the pinion shaft 4. In this embodiment, no thin portion 400 is formed on the pinion shaft 4, and an engagement groove 44 is formed across the entire circumference of the outer peripheral surface of the pinion shaft 4. Further, in this embodiment, no step is formed on an outer surface 72a of the pinion gear washer 72, and the outer surface 72a is a single flat surface as a whole. An insertion hole 720 having an inner diameter slightly greater than the outer diameter of the pinion shaft 4 is formed at the center of the pinion gear washer 72.

The stopper member 90 is an elastic body, and is a C-shaped ring having a discontinuous portion 90a at a position in the circumferential direction. The stopper member 90 has an inner diameter smaller than the outer diameter of the pinion shaft 4 when in a natural state. The stopper member 90 is attached to the pinion shaft 4 in the following manner. The pinion shaft 4 is inserted through the insertion hole 720 of the pinion gear washer 72 in advance. The stopper member 90, with discontinuous portion 90a expanded, is made to pass over the engaged portion 41 of the pinion shaft 4, and is fitted into the engagement groove 44. Thus, the pinion gear washer 72 is engaged with the stopper member 90 fitted to the pinion shaft 4, so that movement of the pinion gear washer 72 toward the engaged portion 41 (toward the slide member 5) is restricted.

As in the first embodiment, an inner surface 72b of the pinion gear washer 72 has a partially concave spherical shape with a curvature radius smaller than that of a back surface 32a of a pinion gear 32. Further, the pinion gear washer 72 has a plurality of oil holes 722 extending through the outer surface 72a and the inner surface 72b. The cylindrical portion 53 of the slide member 5 has a width large enough to allow a recess 531 to accommodate the stopper member 90.

When the pressing force applied to the pinion gear washer 72 from the pinion gear 32 is less than a predetermined value, a predetermined clearance is formed between the outer surface 72a of the pinion gear washer 72 and an inner surface 53a of the cylindrical portion 53 of the slide member 5. When the pressing force applied to the pinion gear washer 72 from the pinion gear 32 is greater than or equal to the predetermined value, the pinion gear washer 72 is elastically deformed as indicated by the long dashed double-short dashed line in FIG. 10C, and the outer surface 72a abuts the inner surface 53a of the cylindrical portion 53 of the slide member 5.

In the second embodiment of the invention described above, as in the first embodiment, it is possible to reduce the weight of the differential apparatus 1.

Next, a third embodiment will be described with reference to FIGS. 11A to 11C. This embodiment is different from the first embodiment in the configuration in which the pinion gear washer 72 is elastically pressed against the pinion gear 32 by an elastic member whose movement relative to the pinion shaft 4 is restricted.

Figure 11A:
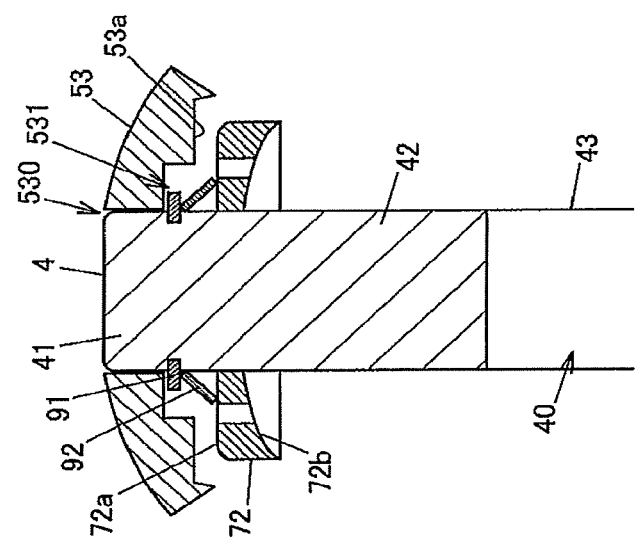
FIG. 11A is an exploded perspective view illustrating a pinion shaft and a pinion gear washer, together with a snap ring and a disc spring, according to a third embodiment of the invention.
Figure 11B:
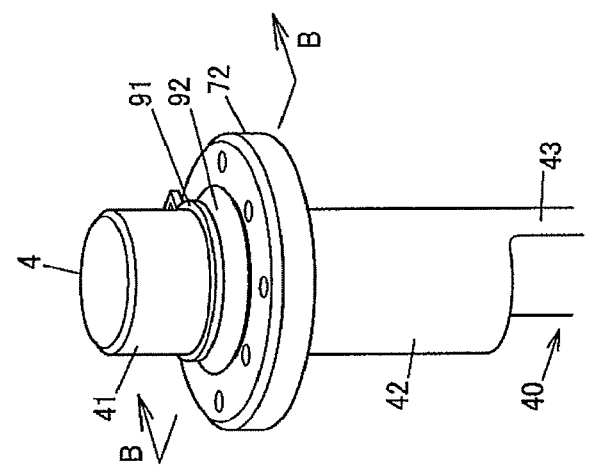
FIG. 11B is a perspective view illustrating the pinion shaft with the pinion gear washer, the snap ring, and the disc spring attached thereto, according to the third embodiment of the invention.
Figure 11C:
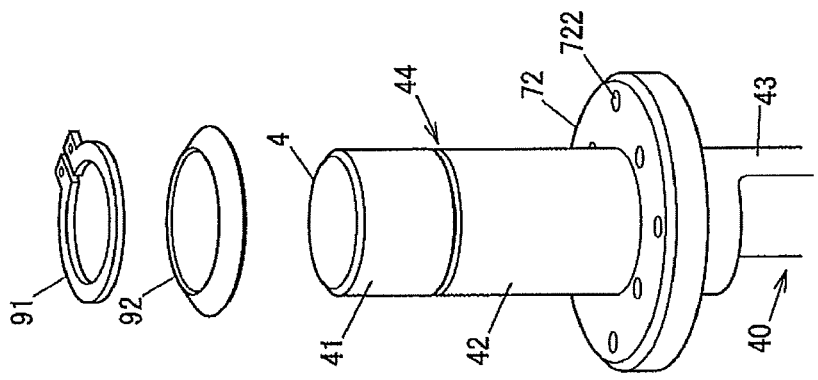
FIG. 11C is a cross-sectional view taken along the line B-B of FIG. 11B, illustrating the pinion shaft, the pinion gear washer, the snap ring, and the disc spring, together with a cylindrical portion of a slide member, according to the third embodiment of the invention.

FIG. 11A is an exploded perspective view illustrating a pinion shaft 4 and a pinion gear washer 72 according to this embodiment, together with a snap ring 91 that is fitted to a pinion shaft 4 and a disc spring 92 serving as an elastic member. FIG. 11B is a perspective view illustrating the pinion shaft 4 with the pinion gear washer 72, the snap ring 91, and the disc spring 92 attached thereto. FIG. 11C is a cross-sectional view taken along the line B-B of FIG. 11B, illustrating the pinion shaft 4, the pinion gear washer 72, the snap ring 91, and the disc spring 92, together with a cylindrical portion 53 of a slide member 5.

The pinion shaft 4 and the pinion gear washer 72 of this embodiment have the same configurations as those in the second embodiment. The snap ring 91 is fitted in an engagement groove 44 of the pinion shaft 4, and the disc spring 92 is disposed between the snap ring 91 and an outer surface 72a of the pinion gear washer 72. The inner peripheral edge of the disc spring 92 abuts the snap ring 91, so that the disc spring 92 presses the pinion gear washer 72 in the axial direction.

When the pressing force applied to the pinion gear washer 72 from the pinion gear 32 is less than a predetermined value, a predetermined clearance is formed between the outer surface 72a of the pinion gear washer 72 and an inner surface 53a of the cylindrical portion 53 of the slide member 5. When the pressing force applied to the pinion gear washer 72 from the pinion gear 32 is greater than or equal to the predetermined value, the disc spring 92 is elastically deformed, and the outer surface 72a of the pinion gear washer 72 abuts the inner surface 53a of the cylindrical portion 53 of the slide member 5.

In the third embodiment of the invention described above, as in the first embodiment, it is possible to reduce the weight of the differential apparatus 1. Note that the elastic member is not limited to the disc spring 92. The elastic member may be a coiled wave spring, a wave washer, or a rubber ring.

Next, a fourth embodiment of the invention will be described with reference to FIG. 12. In the first embodiment, the pinion shafts 4 are supported by the slide member 5, and the slide member 5 is accommodated in the differential case 2. In this embodiment, a differential apparatus 1A does not include a member corresponding to the slide member 5, and a pinion shaft 4 is supported by a differential case 2A. That is, in this embodiment, the differential case 2A serves as a pinion shaft support member.

Figure 12:
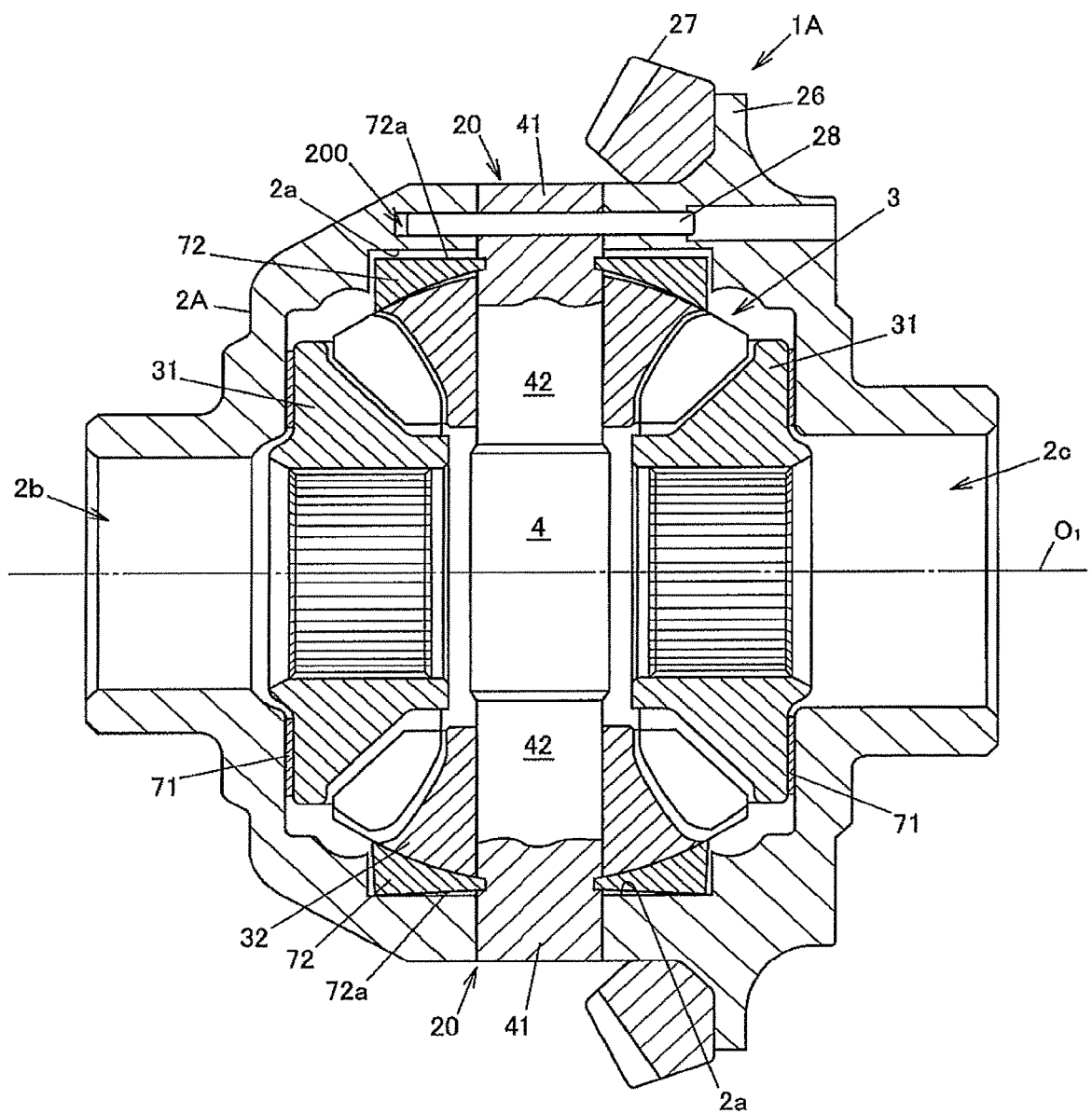
FIG. 12 is a cross-sectional view illustrating a differential apparatus according to a fourth embodiment of the invention.

FIG. 12 is a cross-sectional view illustrating the differential apparatus 1A according to the fourth embodiment of the invention. In FIG. 12, elements having the same functions as those in the first embodiment are denoted by the same reference numerals as those used in FIG. 1 and other drawings, and the description thereof will be omitted.

In the first embodiment, two pinion shafts 4 are coupled to form a cross shape. In this embodiment, the differential apparatus 1A includes a single pinion shaft 4 having a shaft shape, and two pinion gears 32 are rotatably supported by the pinion shaft 4. The differential case 2A has holding holes 20 for holding the opposite ends of the pinion shaft 4. A driving force is input to the differential case 2A from a ring gear 27 that is fixed, for example, by welding to a flange portion 26, so that the differential case 2A rotates about a rotation axis O1. A pin 28 is pressed into a pin insertion hole 200 of the differential case 2A to prevent the pinion shaft 4 from being detached and from rotating.

Pinion gear washers 72 are attached to the pinion shaft 4 with the same attachment structure as that in the first embodiment. However, in this embodiment, no step is formed on an outer surface 72a of each pinion gear washer 72, and the outer surface 72a is a single flat surface as a whole. An inner surface 2a of the differential case 2A facing the outer surface 72a of the pinion gear washer 72 is a flat surface perpendicular to the axial direction of the pinion shaft 4. The inner surface 2a of the differential case 2A faces parallel to the outer surface 72a with a predetermined clearance therebetween when the pinion gear washer 72 is in a natural state. In FIG. 12, the pinion gear washer 72 in a natural state is illustrated on the upper side of the rotation axis O1, and the pinion gear washer 72 in an elastically deformed state is illustrated on the lower side of the rotation axis O1.

The differential case 2A has a shaft insertion hole 2b for inserting a drive shaft that is coupled to one of two side gears 31 so as not to be rotatable relative thereto, and a shaft insertion hole 2c for inserting a drive shaft that is coupled to the other side gear 31 so as not to be rotatable relative thereto. When the differential case 2A is rotated by a driving force input from the ring gear 27, the pinion gear 32 presses the pinion gear washer 72 against the inner surface 2a of the differential case 2A. The pinion gear washer 72 is elastically deformed by the pressing force, so that the outer peripheral edge of the outer surface 72a abuts the inner surface 2a of the differential case 2A.

In the fourth embodiment of the invention described above, as in the first embodiment, the meshing reaction force from the side gears 31 and the centrifugal force applied to the pinion gear 32 are received by the pinion gear washer 72 engaged on the pinion shaft 4. Accordingly, it is possible to reduce the weight of the differential apparatus 1A by reducing the thickness of the differential case 2A.

Various modifications may be made to the invention without departing from the scope and spirit thereof. For example, in the fourth embodiment, the differential apparatus 1A includes a single pinion shaft 4. However, the invention is not limited thereto. For example, the pinion shaft 4 may have a cross shape to rotatably support four pinion gears 32. In this case, the differential case 2A has four inner surfaces 2a respectively facing parallel to outer surfaces 72a of four pinion gear washers 72 for the respective pinion gears 32.

What is claimed is:

1. A differential apparatus comprising:
a differential gear mechanism in which two side gears mesh with a plurality of pinion gears such that a gear axis of the side gears is orthogonal to a gear axis of the pinion gears;
a pinion shaft that rotatably supports the pinion gears;
a hollow pinion shaft support member that supports ends of the pinion shaft and in which the differential gear mechanism is disposed; and
washers each disposed between a corresponding one of the pinion gears and an inner surface of the pinion shaft support member facing the pinion gears, each of the washers having a center portion through which the pinion shaft is inserted; wherein:
movement of each of the washers toward the pinion shaft support member in an axial direction of the pinion shaft is restricted;
when a force of each of the pinion gears pressing a corresponding one of the washers toward the pinion shaft support member is less than a predetermined value, a predetermined clearance is formed between the inner surface of the pinion shaft support member and an outer surface of the washer facing the inner surface in the axial direction; and
when the force of each of the pinion gears pressing a corresponding one of the washers toward the pinion shaft support member is greater than or equal to the predetermined value, the outer surface of the washer abuts the inner surface of the pinion shaft support member.

2. The differential apparatus according to claim 1, wherein
when an inner peripheral edge of each of the washers is engaged with a corresponding one of recesses formed in the pinion shaft, or is engaged with a corresponding one of stopper members fitted on the pinion shaft, such that movement of the washers toward the pinion shaft support member is restricted.

3. The differential apparatus according to claim 2, wherein when each of the washers is rotated relative to the pinion shaft by a predetermined angle, the inner peripheral edge of each of the washers is engaged with the corresponding recess formed in the pinion shaft, and the pinion shaft support member prevents each of the washers from rotating and being disengaged from the corresponding recess.

4. The differential apparatus according to claim 2, wherein
when the pressing force applied to each of the washers from the corresponding one of the pinion gears is greater than or equal to the predetermined value, the washer is elastically deformed by the pressing force, and the outer surface of the washer abuts the inner surface of the pinion shaft support member.

5. The differential apparatus according to claim 1, wherein:
each of the washers is elastically pressed toward the corresponding one of the pinion gears by a corresponding one of elastic members whose movement relative to the pinion shaft is restricted; and
when the pressing force applied to each of the washers from the corresponding one of the pinion gears is greater than or equal to the predetermined value, the elastic member is elastically deformed, and the outer surface of the washer abuts the inner surface of the pinion shaft support member.

6. The differential apparatus according to claim 1, further comprising:

a case member that accommodates the pinion shaft support member such that the pinion shaft support member is relatively movable in a rotation axis direction of the two side gears and is relatively rotatable; and
an actuator that moves the pinion shaft support member relative to the case member in the rotation axis direction; wherein:
when the pinion shaft support member moves relative to the case member to one side in the rotation axis direction, the pinion shaft support member meshes with the case member such that rotation relative to the case member is restricted; and
when the pinion shaft support member moves relative to the case member while the pressing force applied to each of the washers from the corresponding one of the pinion gears is greater than or equal to the predetermined value, the inner surface of the pinion shaft support member slides on the outer surface of the washer.

7. The differential apparatus according to claim 1, wherein:
the pinion gears of the differential gear mechanism are four pinion gears, and the washers are four washers corresponding to the four pinion gears and disposed to face the inner surface of the pinion shaft support member; and
each of the washers receives the pressing force from the corresponding one of the pinion gears and abuts the inner surface of the pinion shaft support member.

* * * * *